United States Patent
Conlon

(10) Patent No.: US 7,963,874 B2
(45) Date of Patent: Jun. 21, 2011

(54) DUAL MODE EVT WITH INPUT SPLIT REVERSE MODE

(75) Inventor: Brendan M. Conlon, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1180 days.

(21) Appl. No.: 11/188,098

(22) Filed: Jul. 22, 2005

(65) Prior Publication Data

US 2007/0021258 A1    Jan. 25, 2007

(51) Int. Cl.
*F16H 3/72* (2006.01)
(52) U.S. Cl. .............. 475/5; 475/275; 475/286
(58) Field of Classification Search .............. 475/5, 271, 475/275–292
See application file for complete search history.

(56) References Cited

U.S. PATENT DOCUMENTS

| 5,931,757 | A | 8/1999 | Schmidt ............ 475/2 |
| 6,527,658 | B2 | 3/2003 | Holmes et al. ............ 475/5 |
| 2005/0102082 | A1 | 5/2005 | Joe et al. ............ 701/54 |
| 2006/0154772 | A1 | 7/2006 | Schmidt et al. ............ 475/5 |
| 2006/0189427 | A1* | 8/2006 | Raghavan et al. ............ 475/5 |
| 2007/0049440 | A1* | 3/2007 | Raghavan et al. ............ 475/5 |

FOREIGN PATENT DOCUMENTS

| DE | 19909424 A1 | 8/2000 |
| DE | 102005038287 A1 | 5/2006 |
| EP | 1396369 A2 | 3/2004 |

* cited by examiner

*Primary Examiner* — David D Le
*Assistant Examiner* — Derek D Knight
(74) *Attorney, Agent, or Firm* — Quinn Law Group, PLLC

(57) ABSTRACT

A transmission is provided with a reverse input split mode and, preferably, a reverse low fixed speed ratio which provides sufficient reverse grade performance while allowing motor size and planetary and transmission ratios to be optimized for fuel economy or other design criteria. Engine-on reverse performance is improved, reducing dependence on the battery and electric motors to meet reverse grade performance requirements.

16 Claims, 4 Drawing Sheets

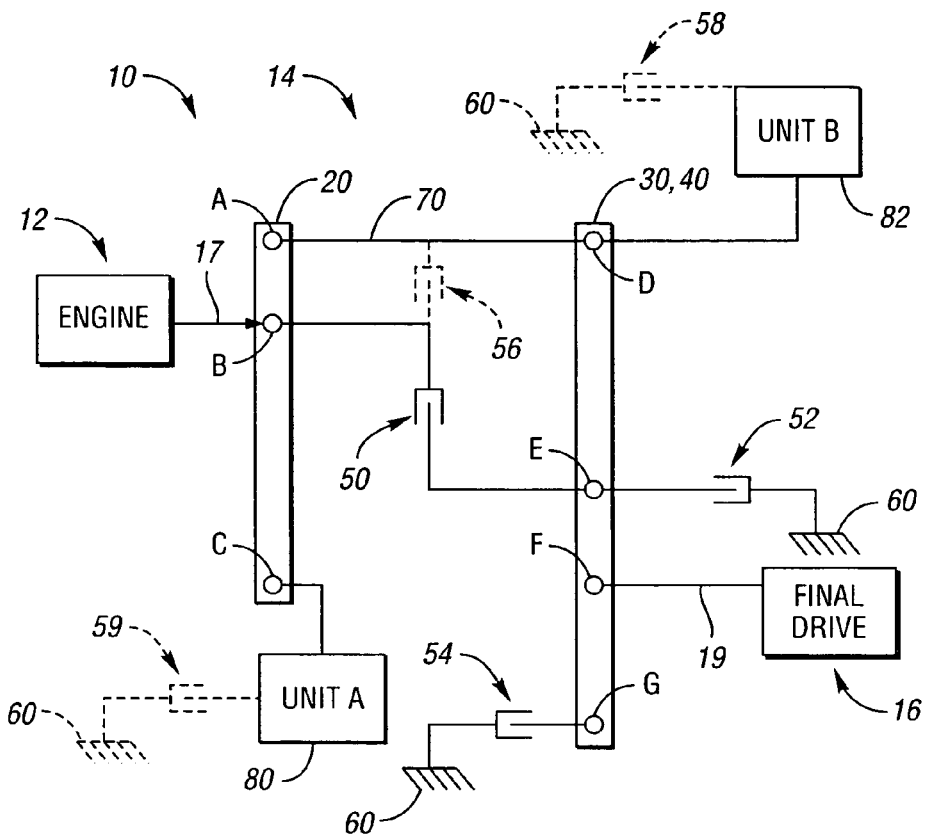
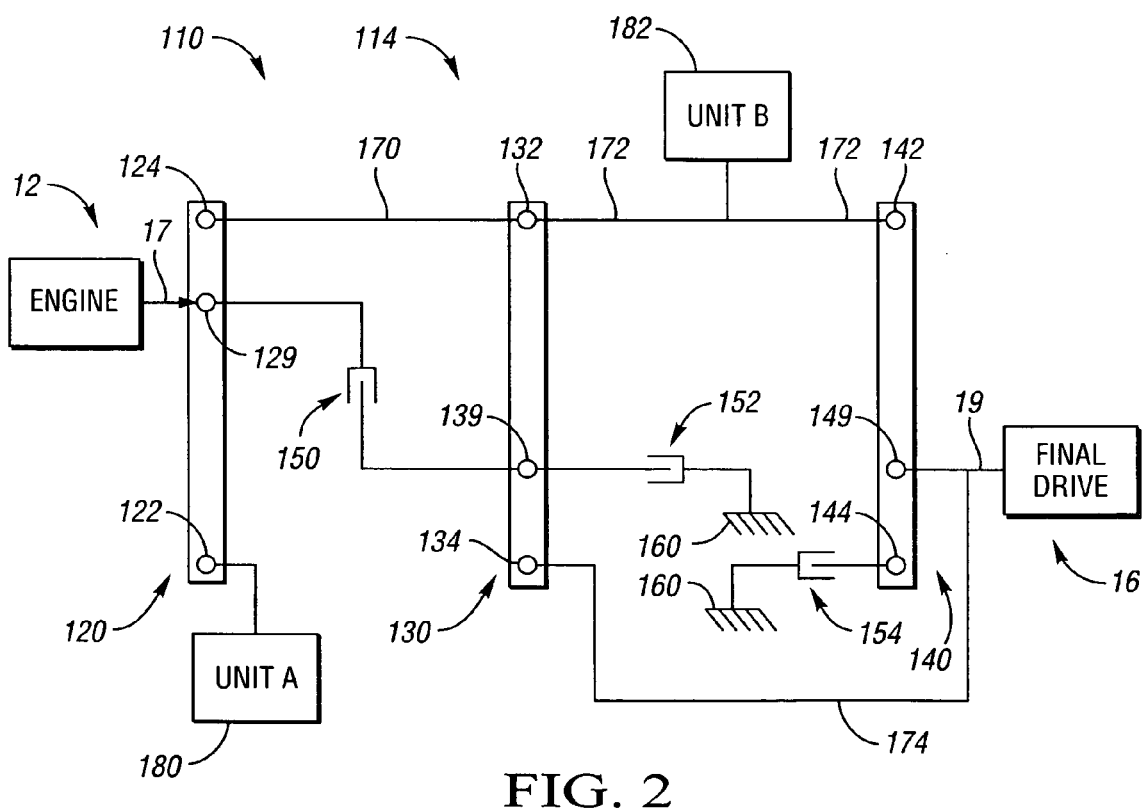

DUAL MODE EVT WITH INPUT SPLIT REVERSE MODE

TECHNICAL FIELD

The present invention relates to electrically variable transmissions with selective operation both in power split variable speed ratio ranges and fixed speed ratios, having three planetary gear sets, two motor/generators and a plurality of torque-transmitting mechanisms to achieve enhanced reverse performance and an efficient electric forward cruise mode that enhances regenerative braking capability.

BACKGROUND OF THE INVENTION

Internal combustion engines, particularly those of the reciprocating piston type, currently propel most vehicles. Such engines are relatively efficient, compact, lightweight, and inexpensive mechanisms by which to convert highly concentrated energy in the form of fuel into useful mechanical power. A novel transmission system, which can be used with internal combustion engines and which can reduce fuel consumption and emissions, may be of great benefit to the public.

The wide variation in the demands that vehicles typically place on internal combustion engines increases fuel consumption and emissions beyond the ideal case for such engines. Typically, a vehicle is propelled by such an engine, which is started from a cold state by a small electric motor and relatively small electric storage batteries, then quickly placed under the loads from propulsion and accessory equipment. Such an engine is also operated through a wide range of speeds and a wide range of loads and typically at an average of approximately a fifth of its maximum power output.

A vehicle transmission typically delivers mechanical power from an engine to the remainder of a drive system, such as fixed final drive gearing, axles and wheels. A typical mechanical transmission allows some freedom in engine operation, usually through alternate selection of five or six different drive ratios, a neutral selection that allows the engine to operate accessories with the vehicle stationary, and clutches or a torque converter for smooth transitions between driving ratios and to start the vehicle from rest with the engine turning. Transmission gear selection typically allows power from the engine to be delivered to the rest of the drive system with a ratio of torque multiplication and speed reduction, with a ratio of torque reduction and speed multiplication known as overdrive, or with a reverse ratio.

An electric generator can transform mechanical power from the engine into electrical power, and an electric motor can transform that electric power back into mechanical power at different torques and speeds for the remainder of the vehicle drive system. This arrangement allows a continuous variation in the ratio of torque and speed between engine and the remainder of the drive system, within the limits of the electric machinery. An electric storage battery used as a source of power for propulsion may be added to this arrangement, forming a series hybrid electric drive system.

The series hybrid system allows the engine to operate with some independence from the torque, speed and power required to propel a vehicle, so the engine may be controlled for improved emissions and efficiency. This system allows the electric machine attached to the engine to act as a motor to start the engine. This system also allows the electric machine attached to the remainder of the drive train to act as a generator, recovering energy from slowing the vehicle into the battery by regenerative braking. A series electric drive suffers from the weight and cost of sufficient electric machinery to transform all of the engine power from mechanical to electrical in the generator and from electrical to mechanical in the drive motor, and from the useful energy lost in these conversions.

A power-split transmission can use what is commonly understood to be "differential gearing" to achieve a continuously variable torque and speed ratio between input and output. An electrically variable transmission can use differential gearing to send a fraction of its transmitted power through a pair of electric motor/generators. The remainder of its power flows through another, parallel path that is all mechanical and direct, of fixed ratio, or alternatively selectable.

One form of differential gearing, as is well known to those skilled in this art, may constitute a planetary gear set. Planetary gearing is usually the preferred embodiment employed in differentially geared inventions, with the advantages of compactness and different torque and speed ratios among all members of the planetary gear set. However, it is possible to construct this invention without planetary gears, as by using bevel gears or other gears in an arrangement where the rotational speed of at least one element of a gear set is always a weighted average of speeds of two other elements.

A hybrid electric vehicle transmission system also includes one or more electric energy storage devices. The typical device is a chemical electric storage battery, but capacitive or mechanical devices, such as an electrically driven flywheel, may also be included. Electric energy storage allows the mechanical output power from the transmission system to the vehicle to vary from the mechanical input power from the engine to the transmission system. The battery or other device also allows for engine starting with the transmission system and for regenerative vehicle braking.

An electrically variable transmission in a vehicle can simply transmit mechanical power from an engine input to a final drive output. To do so, the electric power produced by one motor/generator balances the electrical losses and the electric power consumed by the other motor/generator. By using the above-referenced electrical storage battery, the electric power generated by one motor/generator can be greater than or less than the electric power consumed by the other. Electric power from the battery can sometimes allow both motor/generators to act as motors, especially to assist the engine with vehicle acceleration. Both motors can sometimes act as generators to recharge the battery, especially in regenerative vehicle braking.

A successful substitute for the series hybrid transmission is the two-range, input-split and compound-split electrically variable transmission now produced for transit buses, as disclosed in U.S. Pat. No. 5,931,757, issued Aug. 3, 1999, to Michael Roland Schmidt, commonly assigned with the present application, and hereby incorporated by reference in its entirety. Such a transmission utilizes an input means to receive power from the vehicle engine and a power output means to deliver power to drive the vehicle. First and second motor/generators are connected to an energy storage device, such as a battery, so that the energy storage device can accept power from, and supply power to, the first and second motor/generators. A control unit regulates power flow among the energy storage device and the motor/generators as well as between the first and second motor/generators.

Operation in first or second variable-speed-ratio modes of operation may be selectively achieved by using clutches in the nature of first and second torque transfer devices. In the first mode, an input-power-split speed ratio range is formed by the application of the first clutch, and the output speed of the transmission is proportional to the speed of one motor/generator. In the second mode, a compound-power-split speed ratio range is formed by the application of the second clutch, and the output speed of the transmission is not proportional to the speeds of either of the motor/generators, but is an algebraic linear combination of the speeds of the two motor/generators. Operation at a fixed transmission speed ratio may be selectively achieved by the application of both of the clutches. Operation of the transmission in a neutral mode may be selectively achieved by releasing both clutches, decoupling the engine and both electric motor/generators from the transmission output. The transmission incorporates at least one mechanical point in its first mode of operation and at least two mechanical points in its second mode of operation.

U.S. Pat. No. 6,527,658, issued Mar. 4, 2003 to Holmes et al, commonly assigned with the present application, and hereby incorporated by reference in its entirety, discloses an electrically variable transmission utilizing two planetary gear sets, two motor/generators and two clutches to provide input-split, compound split, neutral and reverse modes of operation. Both planetary gear sets may be simple, or one may be individually compounded. An electrical control member regulates power flow among an energy storage device and the two motor/generators. This transmission provides two ranges or modes of electrically variable transmission (EVT) operation, selectively providing an input-power-split speed ratio range and a compound-power-split speed ratio range. One fixed speed ratio can also be selectively achieved.

Hybrid systems may improve vehicle fuel economy in a variety of ways. For instance, the engine may be turned off at idle, during periods of deceleration and braking, and during periods of low speed or light load operation to eliminate efficiency losses due to engine drag. Captured braking energy (via regenerative braking) or energy stored by one of the motors acting as a generator during periods when the engine is operating is utilized during these engine off periods. Transient demand for engine torque or power is supplemented by the motor/generators during operation in engine-on, electrically variable modes, allowing for downsizing the engine without reducing apparent vehicle performance. Additionally, the engine may be operated at or near the optimal efficiency point for a given power demand. The motor/generators are able to capture vehicle kinetic energy during braking, which is used to keep the engine off longer, supplement engine torque or power and/or operate at a lower engine speed, or supplement accessory power supplies. Additionally, the motor/generators are very efficient in accessory power generation and electric power from the battery serves as an available torque reserve allowing operation at a relatively low transmission numerical speed ratio.

SUMMARY OF THE INVENTION

A transmission is provided with a reverse input split mode and, preferably, a reverse low fixed speed ratio which provides sufficient reverse grade performance while allowing motor size and planetary and transmission ratios to be optimized for fuel economy or other design criteria. A key advantage of this design over other EVT designs for reverse is that the electrical power flow is forward (non-circulating) in both forward and reverse modes. Electrical circulating power in an EVT refers to a condition where the mechanical path carries more than 100% of the output power. Under normal forward electrical power flow conditions, the engine power is split with some portion transmitted electrically and the remainder transmitted mechanically. When a typical EVT operates in reverse, the direction of the electrical power flow is reversed, so the mechanical path must carry the full output power plus the electrical power. Under this condition, the electrical power is said to be circulating in the system. Therefore, the electrical path torque and power must be sized for greater than 100% of the output torque and power in order to accommodate the circulating power. Maximum output torque of a typical EVT is obtained with the engine not producing torque, using battery power. Maximum output torque of the electrically variable transmission of the present invention is obtained with the engine on, yielding more robust performance. Due to the improved reverse performance, the typical requisite increase in motor size and/or higher transmission or planetary ratios is not required in order to achieve sufficient reverse grade performance.

Accordingly, an electrically variable transmission includes an input member to receive power from an engine, an output member, as well as first and second motor/generators. First, second and third planetary gear sets each have first, second and third members and have the input member and the output member each continuously connected to a different one of the members. A first interconnecting member continuously connects a member of the first planetary gear set with a member of either the second or third planetary gear set that is continuously connected with the second motor/generator. A second and a third interconnecting member each continuously connect a different respective one of the members of the second planetary gear set with a different respective one of the members of the third planetary gear set.

In referring to the first, second and third gear sets in this description, and in the claims, these sets may be counted "first" to "third" in any order in the drawings (i.e., left to right, right to left, etc.). Additionally, the first, second or third members of each gear set may be counted "first" to "third" in any order in the drawings (i.e., top to bottom, bottom to top, etc.) for each gear set.

At least three torque-transmitting mechanisms are provided, including a first torque-transmitting mechanism operable for selectively connecting a member of the first planetary gear set that is continuously connected with the input member with a member of the second planetary gear set that is selectively connectable with a stationary member via a second torque-transmitting mechanism. A third torque-transmitting mechanism is operable for selectively connecting a member of the second or third planetary gear set that is not interconnected with any of the other planetary gear sets with the stationary member. The first motor/generator is continuously connected with the member of the first planetary gear set that is not connected with the input member or with the other planetary gear sets. The third torque-transmitting mechanism is selectively engageable to provide an input split, first electrically variable forward mode, and the first torque-transmitting mechanism is selectively engageable to provide a compound split, second electrically variable forward mode.

The output member is preferably continuously connected to a member of the second or third planetary gear set that is not continuously connected with the member of the first planetary gear set and is not selectively connectable with the stationary member.

The torque-transmitting mechanisms are engageable to provide an input split, electrically variable reverse mode and an electric forward cruise mode. The electric forward cruise mode, i.e., in which the engine is off, allows the motors to operate a higher speeds and lower torques to achieve the same output torque, resulting in improved efficiency. Regenerative braking is more efficiently performed during the electric forward cruise mode than during an electrically variable mode in which both motors must supply torque and the speeds of the motors are low. Additionally, engine drag (which further reduces efficiency) is eliminated in the electric forward cruise mode.

The electrically variable transmission may be described in terms of a lever diagram. For example, the first, second and third members of the first planetary gear set are representable by a first lever of a lever diagram having a first, second and third node corresponding with the first, second and third members. Additionally, two of the members of the second planetary gear set are continuously connected with two of the members of the third planetary gear set (e.g., via the second and third interconnecting members described above). Therefore, the second and third planetary gear sets are representable by a second, compounded lever in the lever diagram. The second lever has a fourth, fifth, sixth and seventh node corresponding with the second and third planetary gear sets. The first node is continuously connected with the fourth node. The input member is continuously connected with the second node. The first motor/generator is continuously connected with the third node and the second motor/generator is continuously connected with the fourth node. The first torque-transmitting mechanism is operable for selectively connecting the first node with the fifth node, and the second torque-transmitting mechanism is operable for selectively connecting the fifth node with the stationary member. The output member is continuously connected with the sixth node and the third torque-transmitting mechanism is operable for selectively connecting the seventh node with the stationary member.

In one aspect of the invention, the second torque-transmitting mechanism is selectively engageable to provide the input split, electrically variable reverse mode and the first and second torque-transmitting mechanisms are selectively engageable to provide the electric forward cruise mode. Torque of the first motor/generator is added to torque of the second motor/generator in the electric forward cruise mode. Furthermore, the first and third torque-transmitting mechanisms are selectively engageable to provide a fixed forward speed ratio.

Optionally, a fourth torque-transmitting mechanism may be added to the transmission. The fourth torque-transmitting mechanism is operable for selectively connecting any two members of the first planetary gear set, causing all elements of the first planetary gear set to spin at the same speed (thereby causing the first planetary gear set to be "locked" and inactive in that the tooth ratios of the first planetary gear set do not affect the overall transmission ratio). The second and fourth torque-transmitting mechanisms are engageable to provide a fixed reverse speed ratio. The fixed reverse speed ratio allows the efficiency of a purely mechanical power flow path in the reverse direction. The first torque-transmitting mechanism and the fourth torque-transmitting mechanism are engageable to provide a fixed forward speed ratio and the third torque-transmitting mechanism and the fourth torque-transmitting mechanism are selectively engageable to provide another fixed forward speed ratio. Thus, with the first, second, third and fourth torque-transmitting mechanisms, three fixed forward speed ratios are provided.

In terms of the lever diagram described above, the fourth torque-transmitting mechanism is operable for selectively connecting any two of the first, second and third nodes with one another.

Additional torque-transmitting mechanisms may be employed to achieve additional fixed forward speed ratios. For instance, a fifth torque-transmitting mechanism operable for selectively connecting the second motor/generator with the stationary member may be employed. The first torque-transmitting mechanism and the fifth torque-transmitting mechanism are selectively engageable to provide a fixed forward speed ratio, thereby creating with the first, second, third and fourth torque-transmitting mechanisms a total of four fixed forward speed ratios. Additionally, a sixth torque-transmitting mechanism operable for selectively connecting the first motor/generator with the stationary member may be employed. The first and sixth torque-transmitting mechanisms are selectively engageable to provide a fixed forward speed ratio and the third and sixth torque-transmitting mechanisms are selectively engageable to provide another fixed forward speed ratio. Accordingly, with all six of the torque-transmitting mechanisms, six fixed forward speed ratios may be achieved. Additionally, the second and sixth torque-transmitting mechanisms are selectively engageable to provide a fixed reverse speed ratio.

Specific embodiments of the transmission may be described with respect to the first, second and third members of each gear set being a ring gear member, a planet carrier member and a sun gear member. For instance, in some embodiments, the first motor/generator is continuously connected with the sun gear member of the first planetary gear set and the second interconnecting member continuously connects the ring gear member of the second planetary gear set with the carrier member of the third planetary gear set. In some embodiments, the third interconnecting member continuously connects the carrier member of the second planetary gear set with the ring gear member of the third planetary gear set.

In some embodiments, the first interconnecting member continuously connects the ring gear member of the first planetary gear set with the sun gear member of the second planetary gear set.

In some embodiments, a member of the first planetary gear set may be continuously connected with a member of the second or third planetary gear set via the first interconnecting member where the first interconnecting member connects to the second motor/generator. The member of the second or third planetary gear set is also continuously connected with the second motor/generator; therefore, the first interconnecting member continuously interconnects the member of the first planetary gear set with the member of the second or third planetary gear set via the second motor/generator.

The transmission also provides the efficiency of regenerative braking. An energy storage device operable for supply power to or receiving power from the first and second motor/generators is provided. A controller operable for controlling power transfer between the energy storage device and the first and second motor/generators is further provided. The controller causes at least one of the first and second motor/generators to function as a generator to convert rotational energy of the output member to power stored in the energy storage device during braking. Preferably, regenerative braking occurs during the electric forward cruise mode. This may be more efficient than performing regenerative braking during the second electrically variable forward mode since the engine drag is eliminated when the engine is shut off and both motors need not necessarily supply torque at low speeds as they must during the second electrically variable forward mode.

The arrangement of the torque-transmitting mechanisms within the transmission and the engagement schedule thereof allows for a relatively low numerical top fixed gear ratio in relation to typical hybrid transmission designs, which may improve highway fuel economy.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 1 is a schematic lever diagram illustration of an electrically variable transmission of the present invention;

FIG. 2 is a schematic lever diagram illustration of one embodiment of a transmission within the scope of the lever diagram of FIG. 1;

DESCRIPTION OF THE PREFERRED EMBODIMENTS

Figure 3:
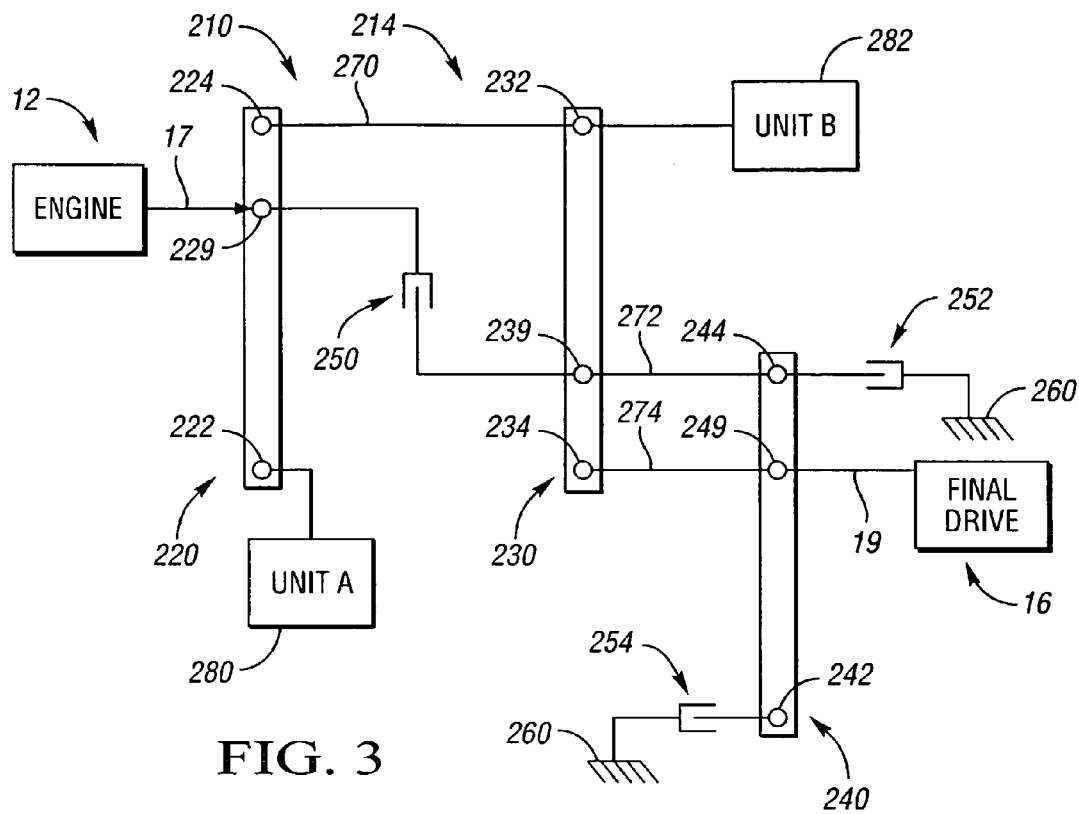
FIG. 3 is a schematic lever diagram illustration of a second embodiment of a transmission within the scope of the lever diagram of FIG. 1.

Referring to the drawings, wherein like reference numbers refer to like components, FIG. 1 shows a powertrain 10 including an engine 12 connected to one embodiment of an electrically variable transmission (EVT) designated generally by the numeral 14. The transmission 14 is designed to receive at least a portion of its driving power from the engine 12. The engine 12 has an output shaft that serves as an input member 17 of the transmission 14. A final drive unit 16 is operably connected to the transmission 14 via an output member 19. The transmission 14 includes three planetary gear sets represented in lever diagram form in FIG. 1, as will be readily understood by those skilled in the art. A lever or first planetary gear set 20 includes a first, second and third node A, B, C, respectively. The nodes A, B and C represent a first, second and third member of the first planetary gear set 20, preferably a ring gear member, a carrier member and a sun gear member, although not necessarily in that order.

The transmission 14 also includes a second lever 30, 40, consisting of two compounded planetary gear sets, a second planetary gear set 30 and a third planetary gear set 40. The planetary gear sets 30 and 40 also have three members which can be a ring gear member, a sun gear member and a planet carrier member. The planetary gear sets 30 and 40 are compounded in that two members of the second planetary gear set 30 are continuously connected with two members of the planetary gear set 40. In some embodiments, an interconnected pair of members may be replaced by a single member functioning in both planetary gear set 30 and planetary gear set 40. In all instances, the compounded planetary gear sets 30, 40 may be represented by the second, four node lever, 30, 40 having a fourth node D, a fifth node E, a sixth node F and a seventh node G. As illustrated and described below with respect to FIGS. 2 through 4, the compounded planetary gear sets 30, 40 may be represented by two separate lever diagrams for the gear sets 30 and 40; however, in either instance two members of the planetary gear set 30 are continuously connected with two members of the planetary gear set 40, and those skilled in the art will recognize that such a compounded planetary gear set may be shown schematically as a single lever or as two separate levers. In the lever diagrams of FIGS. 2 through 4 in which the compounded planetary gear sets 30, 40 are illustrated with two separate levers, the interconnected nature of the nodes will be apparent.

A first interconnecting member 70 continuously interconnects the first node A with the fourth node D. The input member 17 is continuously connected with the second node B. The second node B is also selectively connectable with the fifth node E via a first torque-transmitting mechanism 50. A second torque-transmitting mechanism 52 selectively connects the fifth node E with a stationary member 60, such as the transmission housing. The third node C is continuously connected with a first motor/generator 80. A second motor/generator 82 is continuously connected with the fourth node D of the compounded planetary gear sets 30, 40. The first and second motor/generators 80, 82 may also be referred to herein as Unit A and Unit B, respectively. The sixth node F of the second lever 30, 40 is continuously connected with the output member 19. Finally, the seventh node G is selectively connectable with the transmission housing 60 via a third torque-transmitting mechanism 54.

Three optional torque-transmitting mechanisms may also be employed to achieve various operating states, as will be described below. For instance, a fourth torque-transmitting mechanism 56 (shown in phantom) selectively connects the second node B, i.e., the node continuously connected with the input member 17, with the first and fourth nodes A, D, respectively, via the first interconnecting member 70. Within the scope of the invention, the fourth torque-transmitting mechanism 56 may have alternative locations, but always selectively connects any two members of the first planetary gear set to cause all three members of the first planetary gear set to rotate at the same speed (i.e., the fourth torque-transmitting mechanism 56 acts as a lockup clutch). Additionally, a fifth torque-transmitting mechanism 58 selectively connects the second motor/generator 82 with the transmission housing 60. Finally, a sixth torque-transmitting mechanism 59 selectively connects the first motor/generator 80 with the transmission housing 60. As will be described below, the torque-transmitting mechanisms are selectively engageable to provide a variety of fixed forward speed ratios, an input split and a compound split first and second electrically variable forward mode, an input split reverse mode and a mechanical reverse mode as well as an electric forward cruise mode. As will be understood by those skilled in the art, the first and second motor/generators 80, 82 each have a stator and a rotor (not shown), the rotor being rotatable and the stator being continuously grounded by the transmission housing 60.

Each embodiment of the transmission within the scope of the invention has an electric power source which is operatively connected to the motor/generators such that the motor/generators may transfer power to or receive power from the power source. A controller or ECU is operatively connected to the electric power source to control the distribution of power from or to the power source. An electric power source may be one or more batteries. Other electric power sources, such as fuel cells, have the ability to provide, or store and dispense, electric power and may be used in place of batteries without altering the concepts of the present invention. An electric power source and controller is shown and described with respect to the embodiments of FIGS. 5 through 8. The embodiments of FIGS. 1 through 4 which are represented by lever diagrams also incorporate an electric power source and controller, although not shown, which are operatively connected to the motor/generators in like manner as shown in FIGS. 5 through 8.

Operational Description

Electrically Variable Reverse Mode

The transmission 14 provides an electrically variable reverse mode (characterized by a range of reverse speed ratios) which is capable of launching a vehicle (not shown) in reverse either with the engine 12 off of with the engine 12 running to power the vehicle. The second torque-transmitting mechanism 52 is engaged to establish the electrically variable reverse mode. If the engine 12 is off, the torque-transmitting mechanism 52, which is a stationary type torque-transmitting mechanism such as a brake, grounds node E to the transmission housing 60, which provides reaction torque. The second motor/generator 82 is used to launch the vehicle through a reverse reduction gear ratio provided by the compounded second and third planetary gear sets represented by the second lever 30, 40. For electric reverse operation with engine off, engine 12 remains at zero speed, the second motor/generator 82 is at positive speed, and the first motor/generator 80 is at negative speed. To start the engine, the first motor/generator 80 decelerates to zero speed while the second motor/generator 82 provides reaction torque as well as torque to drive the vehicle. This enables acceleration of the engine 12 to a speed where it may be fueled. Once the engine 12 is running, engine power is split through the first planetary gear set represented by the first lever 20 and the first motor/generator 80, which generates power while the second motor/generator 82 acts as the motor. Thus, power is transmitted to the output member 19 through both a mechanical path and an electrical path. Electrical power flow is in the forward direction as long as the first motor/generator 80 has positive speed. When the first motor/generator 80 decelerates to a negative speed, a second motor/generator 82 acts as a generator to supply power to the first motor/generator 80 to provide engine reaction torque.

Fixed Reverse Speed Ratio

If the optional fourth torque-transmitting mechanism 56 is provided, it may be engaged synchronously when the engine 12 and motor/generators 80, 82 are operating at speeds that create a transmission speed ratio (i.e., (speed of the input member 17)/(speed of the output member 19)) equivalent with a mechanical transmission gear ratio provided by engagement of the torque-transmitting mechanism 56. As used herein, the terms gear ratio and fixed speed ratio have the same meaning. Alternatively, if the optional sixth torque-transmitting mechanism 59 is provided, it may be engaged synchronously when the engine 12 and motor/generators 80, 82 are operating at speeds that create a transmission ratio equivalent with a mechanical transmission ratio provided by engagement of the torque-transmitting mechanism 59. In the fixed reverse speed ratio, the motor/generators 80, 82 are not needed to transmit torque but may be used for an acceleration boost to supplement the engine 12, or as generators.

The electrically variable reverse mode and the fixed reverse speed ratio allow the ring gear/sun gear tooth ratio of the planetary gear sets represented by the first and second levers 20 and 30, 40, respectively, as well as the size of the first and second motor/generators 80, 82, respectively, to be optimized for efficient fuel economy or other design criteria. Because the engine 12 is not off during the electrically variable input split reverse mode, reverse grade requirements may be met without increasing the size of the second motor/generator 82 and/or using higher planetary gear ratios than would otherwise be required for optimum fuel economy.

First Forward Mode

The transmission is capable of providing an electrically variable first forward mode characterized by a range of forward speed ratios. A vehicle may be launched by the transmission 14 with the engine 12 off or with the engine 12 running in the electrically variable first forward mode. To establish the electrically variable first forward mode, the third torque-transmitting mechanism 54 is engaged to ground node G of the second lever 30, 40 to the transmission housing 60. If the engine 12 is off with the third torque-transmitting mechanism 54 engaged, the second motor/generator 82 is used to launch the vehicle through the reduction gear ratio provided by the compounded second and third planetary gear sets represented by the second lever 30, 40. Initially, the engine 12 remains at zero speed and the first motor/generator 80 spins in a reverse direction. To start the engine 12, the first motor/generator 80 decelerates to zero speed while the second motor/generator 82 provides reaction torque as well as torque to drive the vehicle. This enables acceleration of the engine 12 to a speed where it may be fueled. Once the engine 12 is running, engine power provided through the input member 17 is split through the first planetary gear set represented by the first lever 20 and the first motor/generator 80, which generates power while the second motor/generator 82 acts as a motor. Power is transmitted to the output member 19 to drive the vehicle through both a mechanical power path (i.e., through the first planetary gear set 20 and the interconnecting member 70) and an electrical power path (i.e., through the first motor/generator 80 to the second motor/generator 82). Power flows in the forward direction as long as the first motor/generator 80 has positive speed. When the speed of the first motor/generator 80 becomes negative, the second motor/generator 82 acts as a generator to supply power to the first motor/generator 80. Regenerative braking is accomplished using the second motor/generator 82, which is characterized by a direct speed ratio to the output member 19.

Electrically Variable Second Forward Mode

For operation in a second electrically variable forward mode characterized by a lower range of numeric speed ratios, the transmission 14 provides a compound, split mode in which the first torque-transmitting mechanism 50 is engaged and the third torque-transmitting mechanism 54 is released. In this lower range of forward speed ratios, power flows in the forward direction as long as the first and second motor/generators 80, 82, respectively, have positive speed. In this lower range, the second motor/generator 82 acts as a generator and the first motor/generator 80 acts as a motor. If the speed of the second motor/generator 82 becomes negative, the first motor/generator 80 acts as generator to supply power to the second motor/generator 82. If the speed of the first motor/generator 80 is negative, the second motor/generator 82 becomes a generator to supply power to the first motor/generator 80. Regenerative braking may be accomplished in the electrically variable second forward mode by balancing torque of the engine 12 and the first and second motor/generators 80, 82, respectively, to provide the desired deceleration rate of the output member 19.

Fixed Forward Speed Ratios

Within both the first and second electrically variable forward modes, the torque-transmitting mechanisms of the transmission 14 may be utilized to provide multiple fixed forward speed ratios. When the transmission ratio reaches a ratio equivalent to that which may be provided mechanically by engagement of two of the torque-transmitting mechanisms, the appropriate torque-transmitting mechanisms are engaged to provide the fixed ratio. When the transmission 14 is operating in a fixed forward speed ratio, the motor/generators 80, 82 are not utilized to transmit torque from the engine 12 but may be used for an acceleration boost or for regenerative braking. If the optional fourth, fifth and sixth torque-transmitting mechanisms 56, 58 and 59 are provided, up to six forward speed ratios are provided by the transmission 14. Three fixed forward speed ratios are available during the electrically variable first forward mode when the third torque-transmitting mechanism 54 is engaged. By engaging the fourth torque-transmitting mechanism 56, a first fixed speed ratio is provided. At a lower speed ratio, the sixth torque-transmitting mechanism 59 may be engaged to establish a second fixed forward speed ratio. The sixth torque-transmitting mechanism 59 is then disengaged to allow an increase in transmission ratio, in the electrically variable first forward mode. At a yet lower speed ratio, the first torque-transmitting mechanism 50 is engaged while the third torque-transmitting mechanism 54 remains engaged to establish a third fixed forward speed ratio. The first torque-transmitting mechanism 50 is then disengaged to allow the electrically variable first forward mode to resume and provide lower speed ratios. To achieve transmission ratios at the electrically variable second forward mode, the third torque-transmitting mechanism 54 is disengaged while the first torque-transmitting mechanism 50 is engaged. During the electrically variable second forward mode, three additional fixed forward speed ratios may be achieved. First, the sixth torque-transmitting mechanism 59 may be engaged to establish a fourth fixed forward speed ratio. At a lower speed ratio, the fourth torque-transmitting mechanism 56 may be engaged to establish a fifth forward fixed speed ratio. At a still lower speed ratio, the fifth torque-transmitting mechanism 58 may be engaged to establish a sixth forward speed ratio. The sixth fixed forward speed ratio provided by engagement of the first torque-transmitting mechanism 50 and the fifth torque-transmitting mechanism 58 permits top gear ratio as low as 0.66 (sample planetary gear set tooth ratios set forth in paragraph [0078] achieve a sixth fixed gear ratio of 0.661), which is significantly lower than that achieved in overdrive by typical hybrid electrically variable transmissions, and more closely mimics the highway fuel economy of an automatic transmission having a lower numeric ratio. The availability of multiple fixed forward speed ratios allows the transmission 14 to be operated in mechanical mode at a variety of speed ratios which, as is readily apparent to those skilled in the art, increases system efficiency.

Electric Forward Cruise (Regenerative Braking) Mode

During the electrically variable second forward mode, the transmission 14 provides an electric forward cruise mode. The electric forward cruise mode is established by engaging the second torque-transmitting mechanism 52 while the first torque-transmitting mechanism 50 remains engaged and fuel to the engine is cut off so that the engine 12 is stopped. In this arrangement, the motor/generators 80, 82 drive the output member 19 at high ratios of motor speeds to output speed. Additionally, torque from the first and second motor/generators 80, 82 is additive. In this mode, both of the motor/generators 80, 82 are spinning at a high speed relative to the output member 19 and both decelerate in order to start the engine 12. Accordingly, energy of a battery connected to the motor/generators 80, 82 (battery not shown but connected to the motor/generator 80, 82 in like manner as shown and described with respect to the batteries and motor/generator of FIGS. 5 through 8) is augmented by stored kinetic energy of the motor/generators 80, 82 during starting of the engine 12. The kinetic energy of both motor/generators 80, 82 is higher in electric cruise mode than in electrically variable second forward mode. Therefore, during the transition, some of this kinetic energy is available, at the discretion of the control strategy, to either help propel the vehicle or increase the speed of the engine 12. The net effect is that less battery power is required than would otherwise be needed if both motor/generators 80, 82 did not decrease in speed.

The transmission 14 improves regenerative braking efficiency in a mid-speed ratio range. At relatively high numeric transmission speed ratios, the transmission 14 provides efficient regenerative braking because the second motor/generator 82 is directly coupled to the output member 19. Likewise, at low numeric transmission speed ratios, the transmission 14 may operate in the sixth fixed forward speed ratio described above, providing efficient regenerative braking because the first motor/generator 80 is directly coupled to the output member 19. However, when vehicle speed drops below a point in which the sixth fixed forward speed ratio may be utilized, the transmission 14 operates in the electrically variable second forward mode, which is not as efficient for regenerative braking as the sixth fixed forward speed ratio since both of the motor/generators 80, 82 must supply torque and the speeds of the motor/generators are relatively low. If the engine 12 is off, the second motor/generator 82 torque must be negative in order to balance the regenerative braking torque applied to the output member 19 and the negative torque of the first motor/generator 80. However, the second motor/generator 82 will also have negative speed, resulting in positive power flow; hence, there is circulating electrical power in that the first motor/generator 80 generating power will exceed the power flow to the battery. Ideally, each of the motor/generators 80, 82 should carry a fraction of the regenerative braking power of between zero and one, with the sum of the fractions being one. Even if the engine 12 is not off and the second motor/generator 82 has positive speed, the speeds of the motor/generators 80, 82 are relatively low, and there is relatively small mechanical advantage since (neglecting engine drag) the torque of the motor/generators 80, 82 must sum to the transmission output torque. Therefore, if the first motor/generator 80 has a large mechanical advantage, the second motor/generator 82 will have a small mechanical advantage, or vice versa. By incorporating an additional torque reaction point to ground in the lever at node E, the mechanical advantage of both motor/generators 80, 82 is increased. Additionally, if the engine 12 is running during the electrically variable second forward mode, efficiency is further reduced due to engine drag and lower motor speeds. By providing the electric cruise mode with the engine 12 off, the motor/generators 80, 82 operate at higher speeds and lower torques to achieve the same torque at the output member 19, resulting in improved efficiency.

First Preferred Embodiment

Referring to FIG. 2, a first completed preferred embodiment of a powertrain 110 having a transmission 114 within the scope of the invention is illustrated in lever diagram form. The transmission 114 utilizes three differential gear sets, preferably in the nature of planetary gear sets 120, 130 and 140. The planetary gear set 120, represented in lever diagram form, employs a ring gear member 124, a planet carrier member 129 and a sun gear member 122. The ring gear member 124 circumscribes the sun gear member 122. The planet carrier member 129 rotatably supports a plurality of planet gears that meshingly engage both the ring gear member 124 and the sun gear member 122. The input member 17 is secured to the carrier member 129. A first motor/generator 180 is continuously connected with the sun gear member 122. The planetary gear set 120 may be represented by the lever 20 of FIG. 1.

The second planetary gear set 130 represented in lever diagram form employs a ring gear member 134 which circumscribes a sun gear member 132. A planet carrier member 139 rotatably supports a plurality of planet gears that meshingly engage both the ring gear member 134 and the sun gear member 132.

The planetary gear set 140 employs a ring gear member 144 which circumscribes a sun gear member 142. A planet carrier member 149 rotatably supports a plurality of planet gears that meshingly engage both the ring gear member 144 and the sun gear member 142. The output member 19 is continuously connected with the carrier member 149.

The ring gear member 124 is continuously connected with the sun gear member 132 by an interconnecting member 170. The sun gear member 132 is continuously connected with the sun gear member 142 and a second motor/generator 182 via interconnecting member 172 which, as illustrated, may be more than one component. The ring gear member 134 is continuously connected with the carrier member 149 via an interconnecting member 174.

The ring gear member 124 corresponds with the first node A of FIG. 1. The carrier member 129 corresponds with the second node B of FIG. 1. The sun gear member 122 corresponds with the third node C of FIG. 1. Because the second and third planetary gear sets 130, 140 have two pairs of members connected via two separate interconnecting members 172 and 174, the planetary gear sets 130 and 140 are compounded and are represented by the second lever 30, 40 of FIG. 1. The connected sun gear member 132 and sun gear member 142 are together represented by corresponding fourth node D of FIG. 1. The carrier member 139 corresponds with the fifth node E of FIG. 1. The connected ring gear member 134 and carrier member 139 correspond with the sixth node F of FIG. 1. The ring gear member 144 corresponds with the seventh node G of FIG. 1.

The first torque-transmitting mechanism 150 is selectively engageable to connect the carrier member 129 with the carrier member 139. The second torque-transmitting mechanism 152 is selectively engageable to ground the carrier member 139 to the transmission housing 160. The third torque-transmitting mechanism 154 is selectively engageable to ground the ring gear member 144 with the transmission housing 160. The torque-transmitting mechanisms 150, 152 and 154 are engageable in like manner as corresponding torque-transmitting mechanisms 50, 52 and 54, respectively, of FIG. 1 to establish first and second electrically variable forward modes, a fixed forward speed ratio (corresponding with the third fixed forward speed ratio described with respect to FIG. 1) an electric cruise mode, and an input split, electrically variable reverse mode.

Second Alternative Preferred Embodiment

Referring to FIG. 3, a second specific preferred embodiment of a powertrain 210 having a transmission 214 within the scope of the invention is illustrated. Transmission 214 utilizes three differential gear sets, preferably in the nature of planetary gear sets 220, 230 and 240, represented in lever diagram form. The planetary gear set 220 employs a ring gear member 224 which circumscribes the sun gear member 222. Carrier member 229 rotatably supports a plurality of planet gears that meshingly engage both the ring gear member 224 and the sun gear member 222. The input member 17 is secured to the carrier member 229. A first motor/generator 280 is continuously connected to the sun gear member 222.

The planetary gear set 230 has a ring gear member 234 which circumscribes the sun gear member 232. A carrier member 239 includes a plurality of planet gears that meshingly engage both the sun gear member 232 and the ring gear member 234. A second motor/generator 282 is continuously connected to the sun gear member 232.

The planetary gear set 240 includes a ring gear member 244 that circumscribes a sun gear member 242. A carrier member 249 includes a plurality of pinion gears that meshingly engage both the sun gear member 244.

An interconnecting member 270 continuously connects the ring gear member 224 with the sun gear member 232. An interconnecting member 272 continuously connects the carrier member 239 with the ring gear member 244. An interconnecting member 274 continuously connects the ring gear member 234 with the carrier member 249.

The ring gear member 224 corresponds with the first node A of FIG. 1. The carrier member 229 corresponds with the second node B. The sun gear member 222 corresponds with the third node C. The sun gear member 232 corresponds with the fourth node D. The interconnected carrier member 239 and ring gear member 244 correspond with the fifth node E. The interconnected ring gear member 234 and carrier member 249 correspond with the sixth node F. The sun gear member 242 corresponds with the seventh node G. Because the planetary gear sets 230 and 240 have two interconnections via interconnecting members 272 and 274, they may be represented by the single second lever 30, 40 of FIG. 1. The planetary gear set 220 may be represented by the lever 20 of FIG. 1.

A first torque-transmitting mechanism 250 selectively connects the carrier member 229 with the carrier member 239. A second torque-transmitting mechanism 252 selectively connects the ring gear member 244 with the transmission housing 260. A third torque-transmitting mechanism 254 selectively connects the sun gear member 242 with the transmission housing 260. The torque-transmitting mechanisms 250, 252 and 254 are engageable in like manner as corresponding torque-transmitting mechanisms 50, 52 and 54, respectively, as described above with respect to FIG. 1 to establish first and second electrically variable forward modes, an electric forward cruise mode, a fixed forward speed ratio and an input split, electrically variable reverse mode.

Third Preferred Alternative Embodiment

Figure 4:
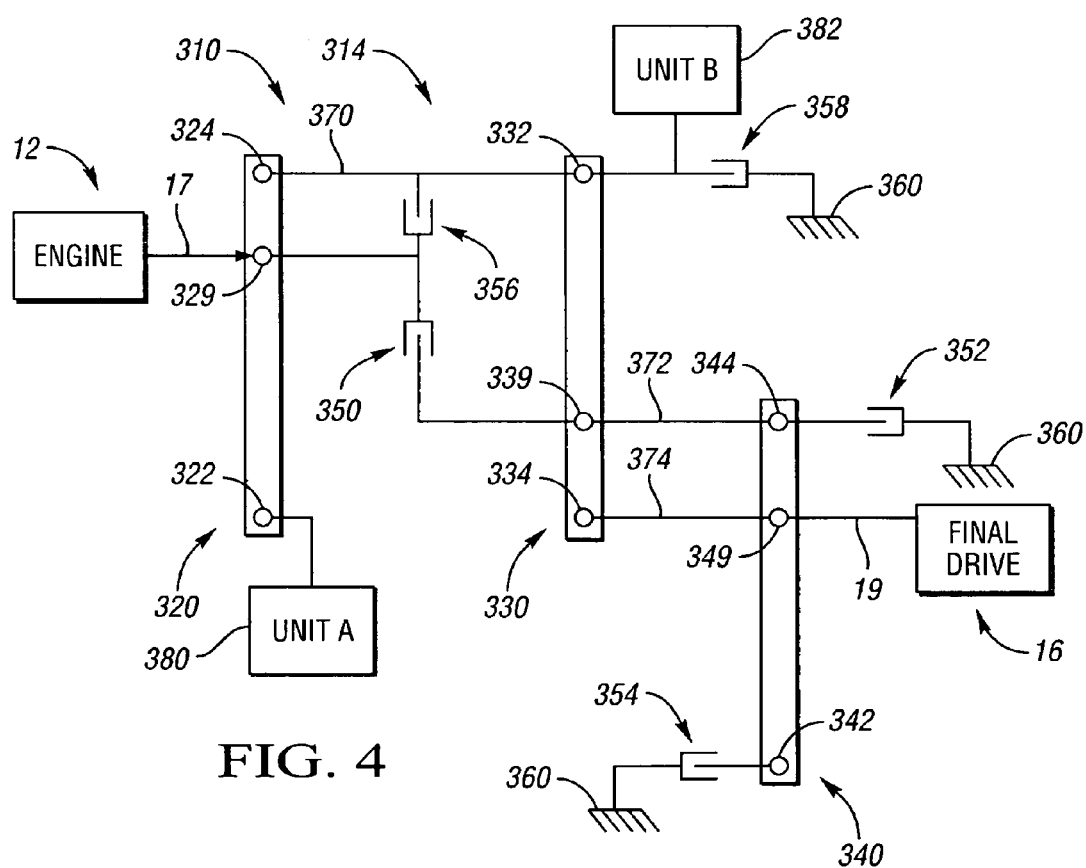
FIG. 4 is a schematic lever diagram illustration of a third embodiment of a transmission within the scope of the lever diagram of FIG. 1.

Referring to FIG. 4, a third specific preferred embodiment of a powertrain 310 having a transmission 314 within the scope of the invention is illustrated. The transmission 314 utilizes three differential gear sets, preferably in the nature of planetary gear sets 320, 330 and 340, represented in lever diagram form. The planetary gear set 320 employs a ring gear member 324 which circumscribes the sun gear member 322. The carrier member 329 rotatably supports a plurality of planet gears that meshingly engage both the ring gear member 324 and the sun gear member 322. The input member 17 is continuously connected with the carrier member 329. A first motor/generator 380 is continuously connected with the sun gear member 322.

The planetary gear set 330 has a ring gear member 334 which circumscribes the sun gear member 332. A carrier member 339 includes a plurality of pinion gears that meshingly engage both the ring gear member 334 and the sun gear member 332. A second motor/generator 382 is continuously connected with the sun gear member 332.

The planetary gear set 340 has a ring gear member 344 which circumscribes the sun gear member 342. A carrier member 349 rotatably supports a plurality of planet gears that meshingly engage both the ring gear member 344 and the sun gear member 342. The output member 19 is continuously connected with the carrier member 349.

An interconnecting member 370 continuously connects the ring gear member 324 with the sun gear member 332. An interconnecting member 372 continuously connects the carrier member 339 with the ring gear member 344. An interconnecting member 374 continuously connects the ring gear member 334 with the carrier member 349.

Because the planetary gear sets 330 and 340 have two pairs of interconnected members via the interconnecting members 372 and 374, they may be represented by the single lever 30, 40 of FIG. 1. The planetary gear set 320 may be represented by the lever 20 of FIG. 1. The ring gear member 324 corresponds with the first node A of FIG. 1. The carrier member 329 corresponds with the second node B. The sun gear member 322 corresponds with the third node C. The sun gear member 332 corresponds with the fourth node D. The interconnected carrier member 339 and ring gear member 344 correspond with the fifth node E. The interconnected ring gear member 334 and carrier member 349 correspond with the sixth node F. The sun gear member 342 corresponds with the seventh node G.

A first torque-transmitting mechanism 350 is selectively engageable to connect the carrier member 329 with the carrier member 339. A second torque-transmitting mechanism 352 is selectively engageable to ground the ring gear member 344 to the transmission housing 360. A third torque-transmitting mechanism 354 is selectively engageable to ground the sun gear member 342 to the transmission housing 360. A fourth torque-transmitting mechanism 356 is selectively engageable to connect the carrier member 329 with the interconnected ring gear member 324 and sun gear member 332. A fifth torque-transmitting mechanism 358 is selectively engageable to ground the sun gear member 332 and the second motor/generator 382 to the transmission housing 360.

The torque-transmitting mechanism 350, 352 and 354 are engageable in like manner as corresponding torque-transmitting mechanisms 50, 52 and 54, respectively, of FIG. 1 to establish first and second electrically variable forward modes, a fixed forward speed ratio, a forward electric cruise mode and an input split, electrically variable reverse speed mode. The additional torque-transmitting mechanisms 356 and 358 are selectively engageable as described above with respect to FIG. 1 in like manner as corresponding torque-transmitting mechanisms 56 and 58 to establish three additional fixed forward speed ratios and a fixed reverse speed ratio. Although not illustrated in the specific embodiments of FIGS. 2 through 8, a sixth torque-transmitting mechanism may be added to ground the first motor/generator 80 (Unit A) to the transmission housing to establish two additional fixed forward speed ratios, as described with respect to torque-transmitting mechanism 59 of FIG. 1, for a total of six fixed forward speed ratios.

Fourth Alternative Preferred Embodiment

Figure 5:
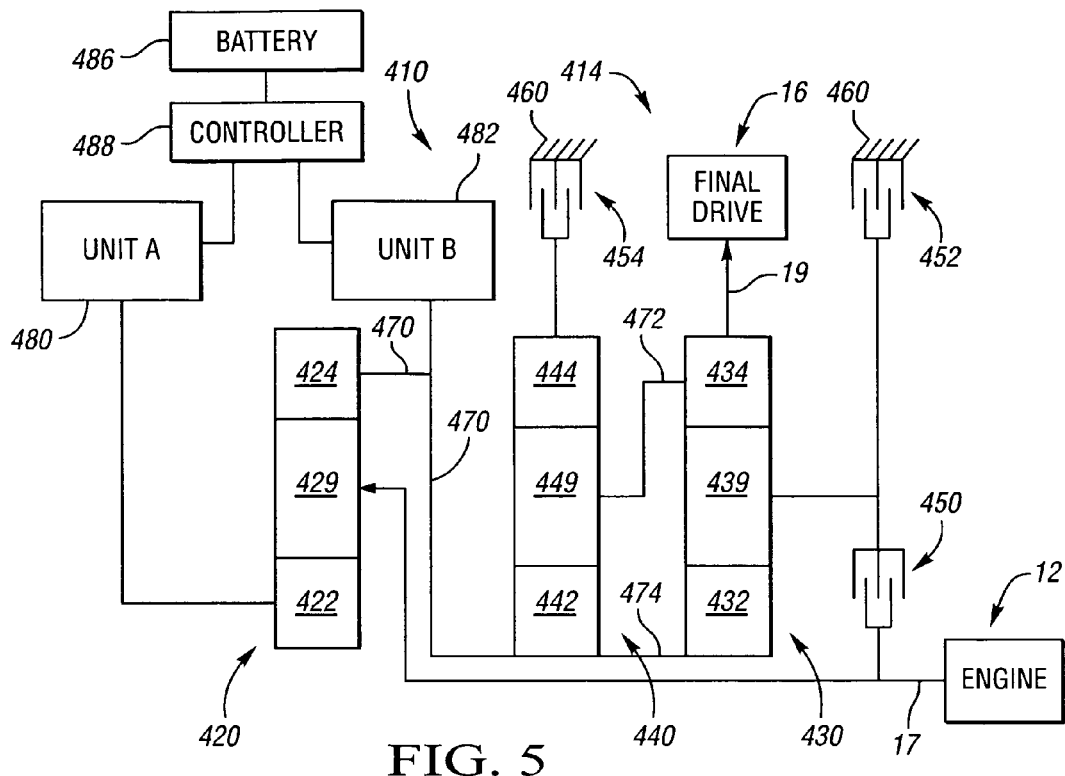
FIG. 5 is a schematic stick diagram illustration of a fourth embodiment of a transmission corresponding with the lever diagram of FIG. 2.

Referring to FIG. 5, a fourth specific preferred embodiment of a powertrain 410 having a transmission 414 within the scope of the invention is illustrated. The transmission 414 utilizes three differential gear sets, preferably in the nature of planetary gear sets 420, 430 and 440. The transmission 414 is shown in a stick diagram rather than a lever diagram form. Planetary gear set 420 employs a ring gear member 424 which circumscribes a sun gear member 422. A carrier member 429 rotatably supports a plurality of pinion gears that meshingly engage both the ring gear member 424 and the sun gear member 422. The input member 17 is continuously connected with the carrier member 429. A first motor/generator 480 is continuously connected with the sun gear member 422.

The planetary gear set 430 includes a ring gear member 434 which circumscribes a sun gear member 432. A carrier member 439 includes a plurality of planet gears that meshingly engage both the ring gear member 434 and the sun gear member 432. The output member 19 is continuously connected with the ring gear member 434. As will be readily understood by those skilled in the art, the transmission 414 is appropriate for a front wheel drive application, as the output member 19 is in a location well suited for transverse arrange usage.

The planetary gear set 440 includes a ring gear member 444 that circumscribes a sun gear member 442. The carrier member 449 includes a plurality of pinion gears that meshingly engage both the ring gear member 444 and the sun gear member 442. The second motor/generator 482 is continuously connected with the sun gear member 442.

An interconnecting member 470 continuously connects the ring gear member 424 with the sun gear member 442. The second motor/generator 482 is thereby also continuously connected with the ring gear member 424. The interconnecting member 470 may be one component or separate components. An interconnecting member 472 continuously the ring gear member 434 with the carrier member 449. An interconnecting member 474 continuously connects the sun gear member 432 with the sun gear member 442. Thus, two members of the planetary gear set 430 are continuously connected with the two members of the planetary gear set 440 via two interconnecting members 472 and 474. Accordingly, the planetary gear sets 430 and 440 may be represented in lever diagram formed by the compound lever 30, 40 of FIG. 1. The planetary gear set 420 may be represented by the lever 20 of FIG. 1.

The ring gear member 424 corresponds with the first node A of FIG. 1. The carrier member 429 corresponds with the second node B of FIG. 1. The sun gear member 422 corresponds with the third node C of FIG. 1. The continuously connected sun gear members 432 and 442 correspond with the fourth node D of FIG. 1. The carrier member 439 corresponds with the fifth node E of FIG. 1. The continuously connected ring gear member 434 and carrier member 449 correspond with the sixth node F of FIG. 1. The ring gear member 444 corresponds with the seventh node G of FIG. 1.

The first torque-transmitting mechanism 450 is selectively engageable to connect the carrier member 429 with the carrier member 439 and also connect the input member 17 with the carrier member 439. The second torque-transmitting mechanism 452 is selectively engageable to ground the carrier member 439 to the transmission housing 460. The third torque-transmitting mechanism 454 is selectively engageable to ground the ring gear member 444 to the transmission housing 460. The torque-transmitting mechanisms 450, 452 and 454 are engageable in like manner as corresponding torque-transmitting mechanisms 50, 52 and 54, respectively, of FIG. 1 to establish first and second electrically variable forward mode, an electric forward cruise mode, a fixed forward speed ratio and an input split, electrically variable reverse mode.

Preferably, each of the planetary gear sets 420, 430 and 440 has a ring gear/sun gear tooth ratio ($N_R/S_R$) of 1.954, although other tooth ratios may also be employed within the scope of the invention. If the optional fourth, fifth and sixth torque-transmitting mechanisms are employed as set forth in FIG. 1 (i.e., a fourth torque transmitting mechanism such as torque-transmitting mechanism 56 of FIG. 1 selectively connects the ring gear member 424 with the carrier member 429; a fifth torque-transmitting mechanism such as torque-transmitting mechanism 58 of FIG. 1 selectively grounds the second motor/generator 482 with the transmission housing 460; and a sixth torque-transmitting mechanism such as torque-transmitting mechanism 59 of FIG. 1 selectively grounds the first motor/generator 480 with the transmission housing 460), six fixed forward gear ratios and a fixed reverse gear ratio are achieved as follows. A first fixed forward gear ratio of 2.954 is achieved by engagement of the third and fourth torque-transmitting mechanisms 454, 56. A second fixed forward gear ratio of 1.954 is achieved by engagement of the third and sixth torque-transmitting mechanisms 454, 59. A third fixed forward gear ratio of 1.661 is achieved by engagement of the third and first torque-transmitting mechanisms 454, 50. A fourth fixed forward gear ratio of 1.355 is achieved by engagement of the first and sixth torque-transmitting mechanisms 450, 59. A fifth fixed forward gear ratio of 1.0 is achieved by engagement of the first and fourth torque-transmitting mechanisms 450, 56. A sixth fixed forward gear ratio of 0.661 is achieved by engagement of the first and fifth torque-transmitting mechanisms 450, 58. Finally, a fixed reverse gear ratio of −1.954 is achieved by engagement of the second and fourth torque-transmitting mechanisms 452, 56.

It is apparent from FIG. 5 in the foregoing description that the transmission 414 selectively receives power from the engine 12. The hybrid transmission 414 also receives power from or transfers power to an electrical power source 486, which is operatively connected to a controller or ECU 488. The electric power source 486 is operatively connected to the motor/generator 480, 482 via the controller 488. The electrical power source 486 may be one or more batteries. Other electrical power sources, such as fuel cells, have the ability to provide, or store and dispense, electrical power and may be used in place of batteries without altering the concepts of the present invention.

Fifth Alternative Preferred Embodiment

Figure 6:
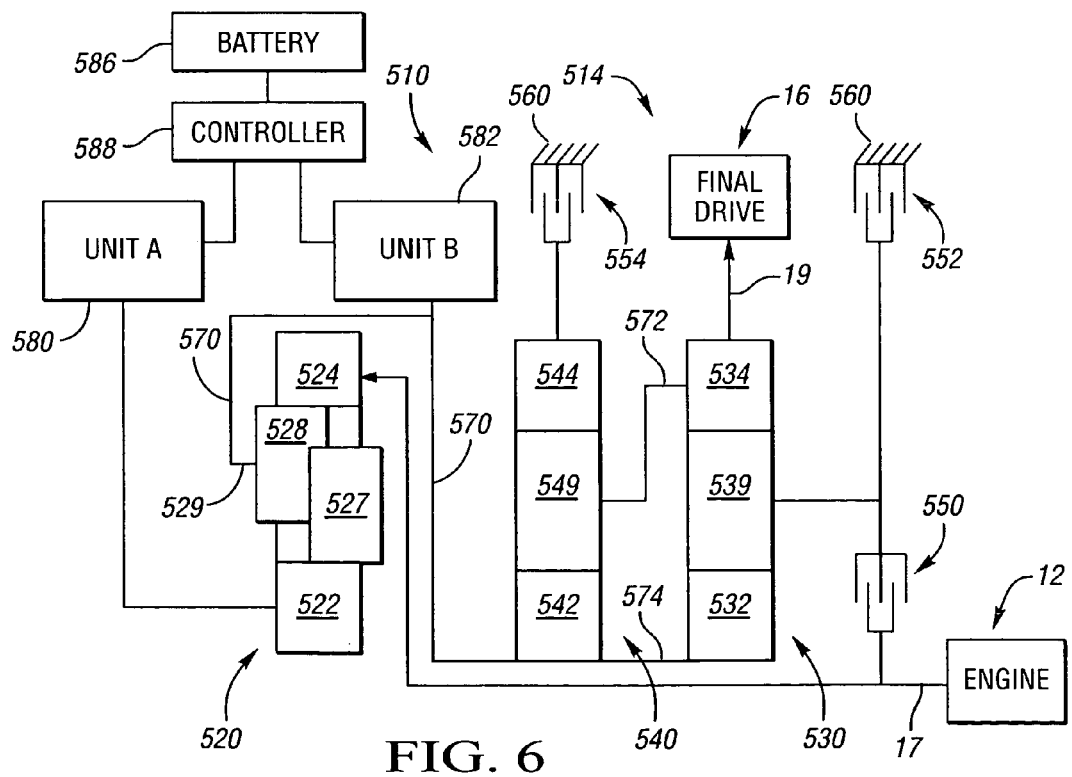
FIG. 6 is a schematic stick diagram illustration of a fifth embodiment of a transmission corresponding with the lever diagram of FIG. 2.

Referring to FIG. 6, a fifth specific preferred embodiment of a powertrain 510 of a transmission 514 within the scope of the invention is illustrated. The transmission 514 utilizes three differential gear sets, preferably in the nature of planetary gear sets 520, 530 and 540. The transmission 514 is illustrated in stick diagram rather than lever diagram form. The planetary gear set 520 employs a ring gear member 524 which circumscribes the sun gear member 522. A carrier member 529 rotatably supports a first set of pinion gears 527 and a second set of pinion gears 528. The first set of pinion gears 527 meshingly engages with the sun gear member 522 and the second set of pinion gears 528. The second set of pinion gears 528 meshingly engage with the first set of pinion gears 527 and with the ring gear member 524. The input member 17 is continuously connected with the ring gear member 524. A first motor/generator 580 is continuously connected with the sun gear member 522.

The second planetary gear set 530 has a ring gear member 534 that circumscribes the sun gear member 532. A carrier member 539 rotatably supports a plurality of pinion gears which meshingly engage with both the sun gear member 532 and the ring gear member 534. The output member 19 is continuously secured to the ring gear member 534. As will be readily understood by those skilled in the art, the transmission 514 is appropriate for a front wheel drive application, as the output member 19 is in a location well suited for transverse arrange usage.

The planetary gear set 540 includes a ring gear member 544 which circumscribes a sun gear member 542. A carrier member 549 includes a plurality of pinion gears which meshingly engage with both the sun gear member 542 and the ring gear member 544. The second motor/generator 582 is continuously connected with the sun gear member 542.

A first interconnecting member 570 continuously connects the carrier member 529 with the sun gear member 542. The interconnecting member 570 may be one component or separate components and also continuously connects the second motor/generator 582 with the carrier member 529. A second interconnecting member 572 continuously connects the ring gear member 534 with the carrier member 549. An interconnecting member 574 continuously connects the sun gear member 532 with the sun gear member 542.

The carrier member 529 corresponds with the first node A of FIG. 1. The ring gear member 524 corresponds with the second node B. The sun gear member 522 corresponds with the third node C. The interconnected sun gear members 532 and 542 correspond with the fourth node D. The carrier member 539 corresponds with the fifth node E. The interconnected ring gear member 534 and carrier member 549 correspond with the sixth node F. The ring gear member 544 corresponds with the seventh node G. Because the planetary gear sets 530 and 540 have two pairs of interconnected members via the interconnecting members 572 and 574, they may be represented by the second lever 30, 40 of FIG. 1. The planetary gear set 520 is represented by the first lever 20 of FIG. 1.

The torque-transmitting mechanism 550 is selectively engageable to connect the ring gear member 524 with the carrier member 539. The carrier member 539 is also thereby continuously connected with the input member 17. The second torque-transmitting mechanism 552 is selectively engageable to ground the carrier member 539 to the transmission housing 560. The third torque-transmitting mechanism 554 is selectively engageable to ground the ring gear member 544 to the transmission housing 560. The torque-transmitting mechanisms 550, 552 and 554 are engageable in like manner as corresponding torque-transmitting mechanisms 50, 52 and 54, respectively, of FIG. 1 to establish first and second electrically variable forward modes, a fixed forward speed ratio, an electric forward cruise mode and an input split, electrically variable reverse mode.

It is apparent from FIG. 6 and the foregoing description that the transmission 514 selectively receives power from the engine 12. The hybrid transmission 514 also receives power from an electrical power source 586, which is operatively connected to a controller or ECE 588. The electrical power source 586 may be one or more batteries. Other electrical power sources, such as fuel cells, may also be used. The battery 586 and controller 588 are operatively connected to the first and second motor/generators 580 and 582 for transferring power to the motor/generators 580, 582 or receiving power therefrom.

Sixth Alternative Preferred Embodiment

Figure 7:
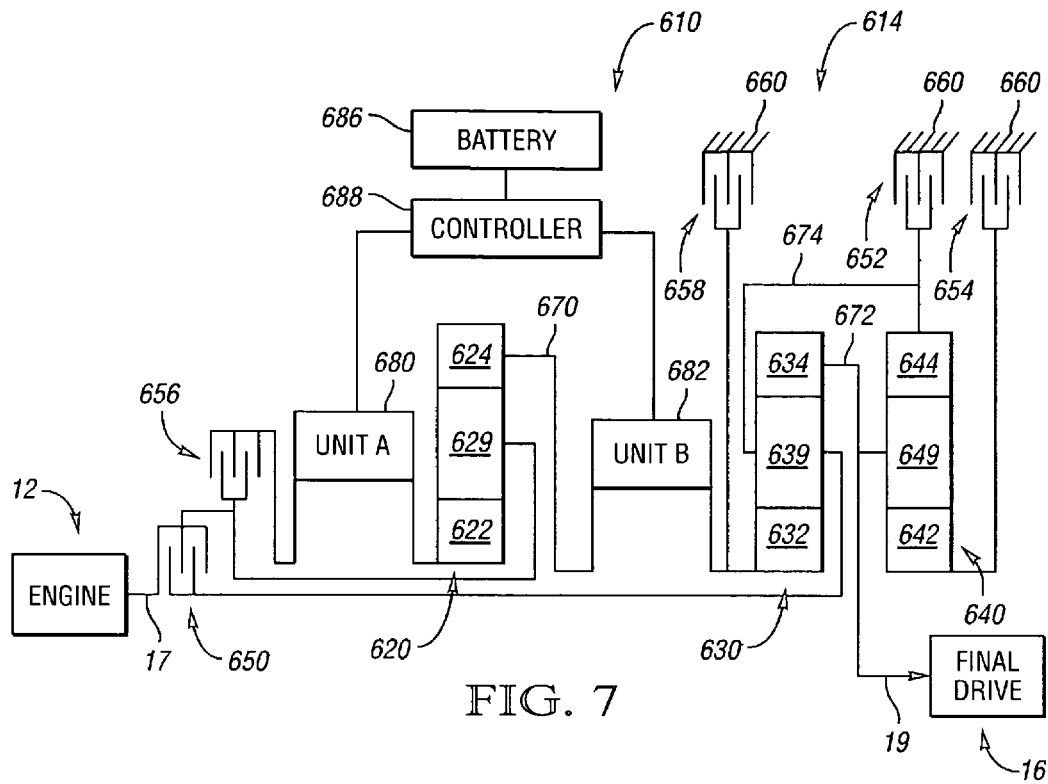
FIG. 7 is a schematic stick diagram illustration of a sixth embodiment of a transmission corresponding with the lever diagram of FIG. 4.

Referring to FIG. 7, a sixth specific preferred embodiment of a powertrain 610 having a transmission 614 within the scope of the invention is illustrated. The transmission 614 utilizes three differential gear sets, preferably in the nature of planetary gear sets 620, 630 and 640. The planetary gear set 620 employs a ring gear member 624 which circumscribes a sun gear member 622. A carrier member 629 includes a plurality of planet gears that meshingly engage both the ring gear member 624 and the sun gear member 622. The input member 17 is continuously connected with the carrier member 629 and a first motor/generator 680 is continuously connected with the sun gear member 622.

The planetary gear set 630 has a ring gear member 634 that circumscribes the sun gear member 632. A carrier member 639 includes a plurality of pinion gears that meshingly engage both the ring gear member 634 and the sun gear member 632. A second motor/generator 682 is continuously connected with the sun gear member 632.

The planetary gear set 640 also has a ring gear member 644 that circumscribes a sun gear member 642. A carrier member 649 includes a plurality of pinion gears that meshingly engage both the ring gear member 644 and the sun gear member 642. The output member 19 is continuously connected with the carrier member 649.

An interconnecting member 670 continuously connects the ring gear member 624 with the second motor/generator 682, thereby continuously connecting the ring gear member 624 with the sun gear member 632, as the sun gear member 632 is also continuously connected with the second motor/generator 682. A second interconnecting member 672 continuously connects the ring gear member 634 with the carrier member 649. A third interconnecting member 674 continuously connects the carrier member 639 with the ring gear member 644.

Although the transmission 614 is represented schematically in stick diagram form in FIG. 7, those skilled in the art will recognize that the planetary gear set 620 may be represented by the lever 20 of FIG. 1. The ring gear member 624 corresponds with the first node A of FIG. 1. The carrier member 629 corresponds with the second node B and the sun gear member 622 corresponds with the third node C. Because the planetary gear sets 630 and 640 have two pairs of interconnected members via the interconnecting members 672 and 674, they may be represented by the compound lever 30, 40 of FIG. 1. The sun gear member 632 corresponds with the fourth node D. The interconnected carrier member 639 and ring gear member 644 correspond with the fifth node E. The interconnected ring gear member 634 and carrier member 649 correspond with the sixth node F. The sun gear member 642 corresponds with the seventh node G.

The first torque-transmitting mechanism 650 selectively connects the carrier member 629 with the carrier member 639. The second torque-transmitting mechanism 652 selectively grounds the carrier member 639 and the interconnected ring gear member 644 with the transmission housing 660. The torque-transmitting mechanism 654 selectively grounds the sun gear member 642 with the transmission housing 660. The fourth torque-transmitting mechanism 656 selectively connects the carrier member 629 with the first motor/generator 680 and thereby with the sun gear member 622 which is continuously connected with the first motor/generator 680. The fifth torque-transmitting mechanism 658 selectively grounds the sun gear member 632 to the transmission housing 660, thereby also grounding the second motor/generator 682 and ring gear member 624.

The torque-transmitting mechanism 650, 652, 654, 656 and 658 are engageable in like manner as corresponding torque-transmitting mechanisms 50, 52, 54, 56 and 58, respectively, of FIG. 1 to establish a first and a second electrically variably forward mode, four fixed forward speed ratios, a forward electric cruise mode, an input split, electrically variable reverse mode and a fixed reverse speed ratio.

Preferably, the planetary gear sets 620 and 640 each have a ring gear/sun gear tooth ratio ($N_R/S_R$) of 1.954 and the planetary gear set 630 has a ring gear/sun gear tooth ratio ($N_R/S_R$) of 2.333, although other tooth ratios may also be employed within the scope of the invention. If the optional fourth, fifth and sixth torque-transmitting mechanisms are employed as set forth in FIG. 1 (i.e., a fourth torque transmitting mechanism such as torque-transmitting mechanism 56 of FIG. 1 selectively connects the ring gear member 624 with the carrier member 629; a fifth torque-transmitting mechanism such as torque-transmitting mechanism 58 of FIG. 1 selectively grounds the second motor/generator 682 with the transmission housing 660; and a sixth torque-transmitting mechanism such as torque-transmitting mechanism 59 of FIG. 1 selectively grounds the first motor/generator 680 with the transmission housing 660), six fixed forward gear ratios and a fixed reverse gear ratio are achieved as follows. A first fixed forward gear ratio of 2.71 is achieved by engagement of the third and fourth torque-transmitting mechanisms 654, 56. A second fixed forward gear ratio of 1.79 is achieved by engagement of the third and sixth torque-transmitting mechanisms 654, 59. A third fixed forward gear ratio of 1.51 is achieved by engagement of the third and first torque-transmitting mechanisms 654, 50. A fourth fixed forward gear ratio of 1.28 is achieved by engagement of the first and sixth torque-transmitting mechanisms 650, 59. A fifth fixed forward gear ratio of 1.0 is achieved by engagement of the first and fourth torque-transmitting mechanisms 650, 56. A sixth fixed forward gear ratio of 0.70 is achieved by engagement of the first and fifth torque-transmitting mechanisms 650, 58. Finally, a fixed reverse gear ratio of −2.33 is achieved by engagement of the second and fourth torque-transmitting mechanisms 652, 56.

It is apparent from FIG. 7 and the foregoing description that the transmission 614 selectively receives power from the engine 12. The hybrid transmission 614 also receives power from an electric power source 686, which is operably connected to a controller or ECU 688. The electric power source 686 may be one or more batteries, or may be fuel cells or other electric power sources which have the ability to provide, or store and dispense, electric power without altering the concepts of the present invention. The battery 686 and controller 688 are operatively connected to the first and second motor/generators 680 and 682 for transferring power to the motor/generators 680, 682 or receiving power therefrom. The configuration of the transmission 614 of FIG. 7 is appropriate for a rear wheel drive longitudinal application.

Seventh Preferred Alternative Embodiment

Figure 8:
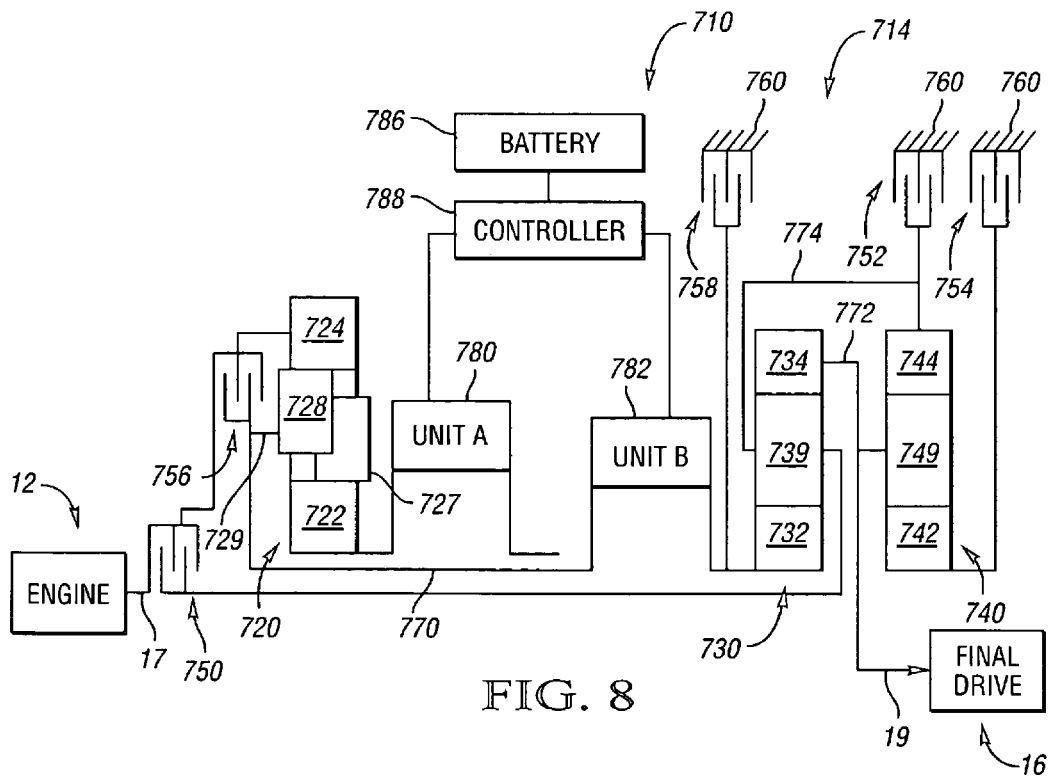
FIG. 8 is a schematic stick diagram illustration of a seventh embodiment of a transmission corresponding with the lever diagram of FIG. 4.

Referring to FIG. 8, a seventh specific preferred embodiment of a powertrain 710 having a transmission 714 within the scope of the present invention is illustrated. The transmission 714 utilizes three differential gear sets, preferably in the nature of planetary gear sets 720, 730 and 740. The planetary gear set 720 employs a ring gear member 724 which circumscribes the sun gear member 722. A carrier member 729 includes a first and a second set of pinion gears 727, 728, respectively. The first set of pinion gears 727 meshingly engage the sun gear member 722 and the second set of pinion gears 728. The second set of pinion gears 728 meshingly engages with the first set of pinion gears 727 and the ring gear member 724. The input member 17 is continuously connected with the ring gear member 724. The first motor/generator 780 is continuously connected with the sun gear member 722.

The planetary gear set 730 has a ring gear member 734 which circumscribes the sun gear member 732. A carrier member 739 includes a plurality of pinion gears which meshingly engage with both the ring gear member 734 and the sun gear member 732. The second motor/generator 782 is continuously connected with the sun gear member 732.

The planetary gear set 740 has a ring gear member 744 which circumscribes the sun gear member 742. A carrier member 749 includes a plurality of pinion gears that meshingly engage the ring gear member 744 and the sun gear member 742. The output member 19 is continuously connected with the carrier member 749.

An interconnecting member 770 continuously connects the carrier member 729 with the second motor/generator 782 and therefore with the sun gear member 732 which is also continuously connected with the second motor/generator 782. A carrier member 772 continuously connects the ring gear member 734 with the carrier member 749 and thereby with the output member 19. An interconnecting member 774 continuously connects the carrier member 739 with the ring gear member 744.

Although the transmission 714 of FIG. 8 is illustrated in stick diagram form, those skilled in the art will readily understand that the planetary gear set 720 is represented by the first lever 20 of FIG. 1 and the compounded planetary gear sets 730 and 740 are represented by the second lever diagram 30, 40 of FIG. 1. Carrier member 729 corresponds with the first node A of FIG. 1. The ring gear member 724 corresponds with the second node B. The sun gear member 722 corresponds with the third node C. The sun gear member 732 corresponds with the fourth node D. The interconnected carrier member 739 and ring gear member 744 correspond with the fifth node E. The interconnected ring gear member 734 and carrier member 749 correspond with the sixth node F. The sun gear member 742 corresponds with the seventh node G.

A first torque-transmitting mechanism 750 selectively connects the ring gear member 724 with the carrier member 739. A second torque-transmitting mechanism 752 selectively grounds the carrier member 739 and the ring gear member 744 with the transmission housing 760. A third torque-transmitting mechanism 754 selectively grounds the sun gear member 742 with the transmission housing 760. A fourth torque-transmitting mechanism 756 selectively connects the ring gear member 724 with the carrier member 729, and with the second motor/generator 782 and thereby with the sun gear member 732 which is continuously connected with the second motor/generator 782. A fifth torque-transmitting mechanism 758 selectively grounds the sun gear member 732 to the transmission housing 760, thereby also grounding the second motor/generator 782 and carrier member 729. The torque-transmitting mechanisms 750, 752, 754, 756 and 758 are engageable in like manner as corresponding torque-transmitting mechanisms 50, 52, 54, 56 and 58, respectively, of FIG. 1 to establish a first and a second electrically variable forward mode, four fixed forward speed ratios, an electric forward cruise mode, an input split electrically variable reverse mode and a fixed reverse speed ratio. If a sixth torque-transmitting mechanism were added to the transmission 714 of FIG. 8 to ground the first motor/generator 780 to the transmission housing 760, two additional fixed forward speed ratios for a total of six fixed forward speed ratios would be achieved.

It is apparent from FIG. 8 and the foregoing description that the transmission 714 selectively receives power from the engine 12. The hybrid transmission 714 also receives power from an electric power source 786, which is operably connected to a controller or ECU 788. The electric power source 786 may be one or more batteries, or may be fuel cells or other electric power sources which have the ability to provide, or store and dispense, electric power without altering the concepts of the present invention. The battery 786 and controller 788 are operatively connected to the first and second motor/generators 780 and 782 for transferring power to the motor/generators 780, 782 or receiving power therefrom. The configuration of the transmission 714 of FIG. 8 is appropriate for a rear wheel drive longitudinal application.

While the best modes for carrying out the invention have been described in detail, those familiar with the art to which this invention relates will recognize various alternative designs and embodiments for practicing the invention within the scope of the appended claims.

The invention claimed is:

1. An electrically variable transmission comprising:
an input member to receive power from an engine;
an output member;
first and second motor/generators;
first, second and third planetary gear sets each having first, second and third members, said input and output members each being continuously connected to a different one of said members;
a first interconnecting member continuously connecting a member of said first planetary gear set with a member of said second or third planetary gear set that is continuously connected with said second motor/generator;
a second and a third interconnecting member each continuously connecting a different respective one of said members of said second planetary gear set with a different respective one of said members of said third planetary gear set;
a first torque-transmitting mechanism operable for selectively connecting a member of said first planetary gear set continuously connected with said input member with a member of said second planetary gear set selectively connectable with a stationary member via a second torque-transmitting mechanism;
a third torque-transmitting mechanism operable for selectively connecting a member of said second or third planetary gear set not interconnected with any of said other planetary gear sets with said stationary member;
said first motor/generator being continuously connected with a member of said first planetary gear set not connected with said input member or with said other planetary gear sets; and
wherein said torque-transmitting mechanisms are engagable to provide an input split, electrically variable reverse mode and an electric forward cruise mode.

2. The electrically variable transmission of claim 1, wherein said second torque-transmitting mechanism is selectively engageable to provide said input split, electrically variable reverse mode;
wherein said first and second torque-transmitting mechanisms are selectively engageable to provide said electric forward cruise mode; and
wherein said first and third torque-transmitting mechanisms are selectively engageable to provide a first fixed forward speed ratio.

3. The electrically variable transmission of claim 2, wherein torque of said first motor/generator is added to torque of said second motor/generator in said electric forward cruise mode.

4. The electrically variable transmission of claim 1, further comprising:
a fourth torque-transmitting mechanism operable for selectively connecting any one of said members of said first planetary gear set with any other one of said members of said first planetary gear set;
wherein said second and fourth torque-transmitting mechanisms are engageable to provide a fixed reverse speed ratio;
wherein said first torque-transmitting mechanism and said fourth torque-transmitting mechanism are engageable to provide a second fixed forward speed ratio; and
wherein said third torque-transmitting mechanism and said fourth torque-transmitting mechanism are selectively engageable to provide a third fixed forward speed ratio.

5. The electrically variable transmission of claim 1, further comprising:
a fifth torque-transmitting mechanism operable for selectively connecting said second motor/generator with said stationary member; wherein said first torque-transmitting mechanism and said fifth torque-transmitting mechanism are selectively engageable to provide another fixed forward speed ratio.

6. The electrically variable transmission of claim 1, further comprising:
a sixth torque-transmitting mechanism operable for selectively connecting said first motor/generator with said stationary member; wherein said first torque-transmitting mechanism and said sixth torque-transmitting mechanism are selectively engageable to provide a different fixed forward speed ratio; wherein said third torque-transmitting mechanism and said sixth torque-transmitting mechanism are selectively engageable to provide another different fixed forward speed ratio; and wherein said second torque-transmitting mechanism and said sixth torque-transmitting mechanism are selectively engageable to provide a fixed reverse speed ratio.

7. The electrically variable transmission of claim 1, wherein said third torque-transmitting mechanism is selectively engageable to provide an input split, first electrically variable forward mode; and wherein said first torque-transmitting mechanism is selectively engageable to provide a compound split, second electrically variable forward mode.

8. The electrically variable transmission of claim 7, further comprising:
an energy storage device operable for supplying power to or receiving power from said first and second motor/generators;
a controller operable for controlling power transfer between said energy storage device and said first and second motor/generators; and
wherein said controller causes at least one of said first and second motor/generators to function as a generator to convert rotational energy of said output member to power stored in said energy storage device during braking.

9. The electrically variable transmission of claim 1, wherein said output member is continuously connected to a member of said second or third planetary gear set not continuously connected with a member of said first planetary gear set and not selectively connectable with said stationary member.

10. The electrically variable transmission of claim 1, wherein said first, second and third planetary gear sets include a ring gear member, a planet carrier member and a sun gear member;
wherein said first motor/generator is continuously connected with said sun gear member of said first planetary gear set; and
wherein said second interconnecting member continuously connects said ring gear member of said second planetary gear set with said carrier member of said third planetary gear set.

11. The electrically variable transmission of claim 10, wherein said third interconnecting member continuously connects said carrier member of said second planetary gear set with said ring gear member of said third planetary gear set.

12. The electrically variable transmission of claim 10, wherein said first interconnecting member continuously connects said ring gear member of said first planetary gear set with said sun gear member of said second planetary gear set.

13. The electrically variable transmission of claim 1, wherein said first interconnecting member continuously connects said member of said first planetary gear set with said second motor/generator; said first interconnecting member thereby operatively connecting said member of said first planetary gear set with said member of said second or third planetary gear set.

14. An electrically variable transmission comprising:
an input member to receive power from an engine;
an output member;
first and second motor/generators;
first, second and third planetary gear sets each having ring gear member, a carrier member and a sun gear member, said input and output members each being continuously connected to a different one of said members;
a first interconnecting member continuously connecting said ring gear member or said carrier member of said first planetary gear set with said sun gear member of said second planetary gear set, said sun gear member of said second planetary gear set also being continuously connected with said second motor/generator;
a second and a third interconnecting member each continuously connecting a different respective one of said members of said second planetary gear set with a different respective one of said members of said third planetary gear set, one of said second and third interconnecting members continuously connecting said ring gear member of said second planetary gear set with said carrier member of said third planetary gear set;
a first torque-transmitting mechanism operable for selectively connecting said member of said first planetary gear set continuously connected with said input member with a member of said second planetary gear set selectively connectable with a stationary member via a second torque-transmitting mechanism; and
a third torque-transmitting mechanism operable for selectively connecting a member of said second or third planetary gear set not continuously connected with any of said other planetary gear sets with said stationary member;
wherein first motor/generator is continuously connected with a member of said first planetary gear set not continuously connected with said input member or with said other planetary gear sets; and
wherein said torque-transmitting mechanisms are engageable alone or in pairs to provide an input split, electrically variable reverse mode, a fixed forward speed ratio, an electric forward cruise mode, an input split, electrically variable first forward mode and a compound split, electrically variable second forward mode.

15. The electrically variable transmission of claim 14, further comprising:
a fourth torque-transmitting mechanism operable for selectively connecting any one of said members of said first planetary gear set with any other one of said members of said first planetary gear set;
wherein said second and fourth torque-transmitting mechanisms are engageable to provide a fixed reverse speed ratio;
wherein said first torque-transmitting mechanism and said fourth torque-transmitting mechanism are engageable to provide a second fixed forward speed ratio; and
wherein said third torque-transmitting mechanism and said fourth torque-transmitting mechanism are selectively engageable to provide a third fixed forward speed ratio.

16. The electrically variable transmission of claim 14, further comprising:
at least one of a fifth torque-transmitting mechanism and a sixth torque-transmitting mechanism;
wherein said fifth torque-transmitting mechanism is operable for selectively connecting said second motor/generator with said stationary member and is engageable with said first torque-transmitting mechanism to provide another fixed forward speed ratio;
wherein said sixth torque-transmitting mechanism is operable for selectively connecting said first motor/generator with said stationary member and is engageable with said first torque-transmitting mechanism to provide a different fixed forward speed ratio; wherein said third torque-transmitting mechanism and said sixth torque-transmitting mechanism are selectively engageable to provide another different fixed forward speed ratio; and wherein said second torque-transmitting mechanism and said sixth torque-transmitting mechanism are selectively engageable to provide a fixed reverse speed ratio.

* * * * *